April 20, 1937. H. B. BRISTOL 2,077,668
HOSE STAND
Filed April 29, 1935
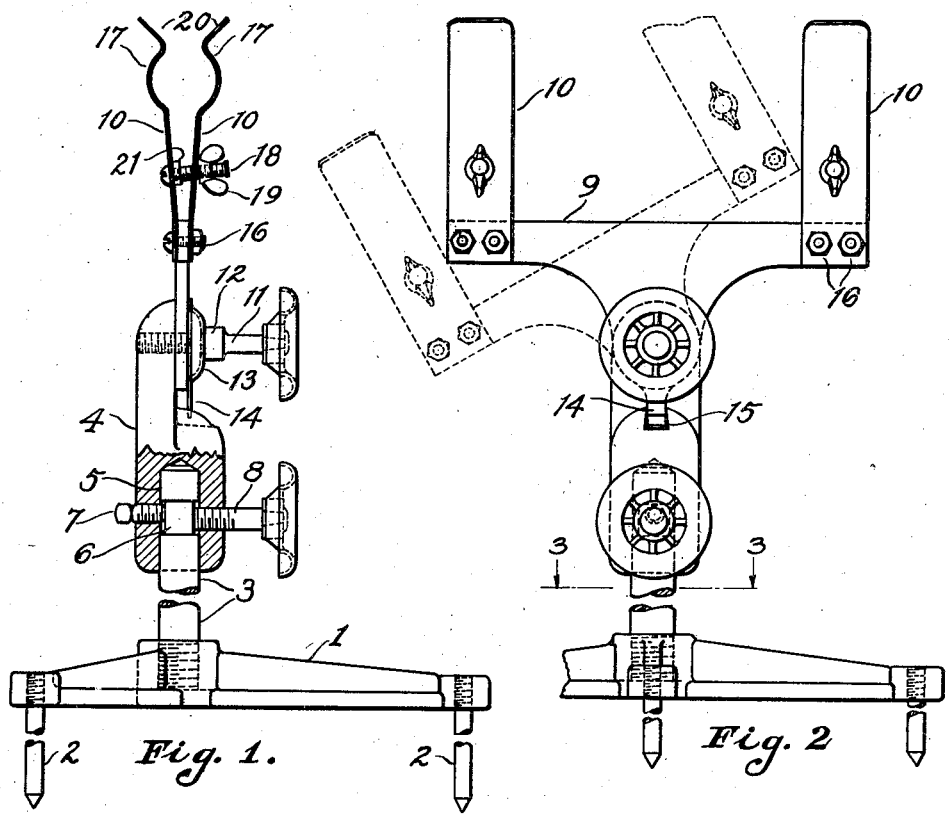
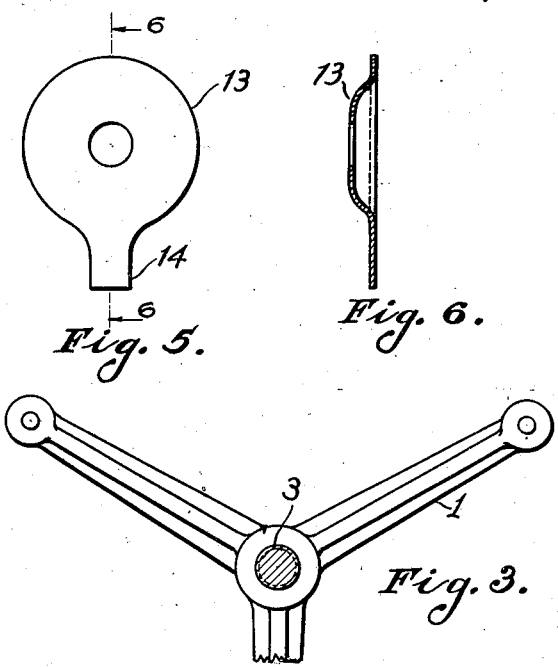
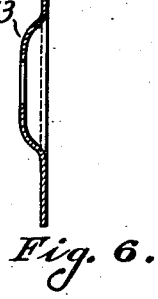
Inventor:
HAROLD BENNETT BRISTOL,
By John H. Bruninga.
Attorney.

Patented Apr. 20, 1937

2,077,668

UNITED STATES PATENT OFFICE 2,077,668

HOSE STAND

Harold Bennett Bristol, St. Louis, Mo.

Application April 29, 1935, Serial No. 18,864

1 Claim. (Cl. 248—82)

This invention pertains to a hose stand, such as may be used for supporting a hose in sprinkling position on a lawn.

One of the objects of this invention is to provide such a stand which may be firmly mounted and anchored in the ground and adjusted to support a hose in any desired position.

Another object is to provide such a stand having a spring hose clamp into which the hose may be inserted or removed without readjusting the clamp.

Another object is to provide such a stand of improved construction, which will be simple to manufacture and rugged and durable in service.

Further objects will appear from the following description taken in connection with the accompanying drawing, in which Figure 1 is an end view, partly in section, showing a hose stand embodying this invention;

Figure 2 is a side view of the same;

Figure 3 is a section on line 3—3 of Figure 2;

Figure 4 is a sectional detail of the swiveling head, showing a modified construction;

Figure 5 is a face view of the spring clamping washer; and

Figure 6 is a section on line 6—6 of Figure 5.

Referring to the drawing, 1 is a base adapted to rest upon the ground and steady the hose stand as a whole. This base is equipped with radial arms in tripod formation, as shown in Figure 3, which arms are equipped at their ends with downwardly extending prongs 2 adapted to be inserted into the ground so as to anchor the base 1 thereto. These prongs are preferably about six inches long so as to form a secure anchor for the base 1.

Mounted on the base 1 is an upright 3 supported in a vertical position on the base 1. This upright is preferably about two or two and one-half feet high and carries at its upper end a swiveling head 4. The head 4 is provided with a socket 5 adapted to receive the upper end of the standard 3. The latter is provided with a reduced portion 6 into which a set screw 7 may extend so as to retain the head loosely upon the upright 3 so as to swivel thereon. A clamping screw 8, threaded into the head 4, is also arranged to engage the portion 6 so that the head 4 may be clamped against swiveling movement by the screw 8.

A hose clamp 9, preferably in the form of a flat T head having spaced spring arms 10 adapted to receive and hold a hose, is pivoted on a clamping screw 11 threaded in the head 4. The screw 11 is provided with a shoulder 12 bearing upon a spring washer 13, which washer in turn bears against the hose clamp 9 so as resiliently to clamp the latter in any adjusted position. The washer 13 is provided with a radial extension 14 adapted to extend into a socket 15 in the head 4 so as to secure the washer 13 against rotation on the screw 11. This prevents the washer 13 from turning and assists in securely clamping the hose clamp 9 at any angle on the head 4 as indicated, for instance, in dotted lines in Figure 2.

The spring arms 10 are spaced horizontally along the clamp 9, as shown in Figure 2. These arms are secured to the clamp 9 by studs 16 or other suitable fastenings and are arranged to extend upwardly in diverging relation, provided with curved portions 17 adapted to grip a hose between the arms. A stud 18, having a wing nut 19, is arranged to clamp the arms 10 together so as to adjust the spring tension thereof. This adjustment provides that different sizes of hose may be securely held in the clamping arms 10 and with a resilient grip so that the hose may be inserted or removed by simply pressing it into or out of the socket formed by the curved portion 17. The upper ends of the arms 10 are flared as shown at 20 providing cam portions to spread the arms when the hose is inserted. The stud 18 is secured against rotation by a lock nut 21 placed between the arms 10 and drawn up tightly against one of them. This nut also provides a stop to prevent the arms 10 being drawn too close together.

In the construction of Figure 4, the upper portion of the upright 3 is tapered where it enters the socket 5. This socket is also tapered to correspond. This arrangement provides a firm seat for the head upon the upright and also is adapted automatically to take up wear at these points.

In the use of this device, the base 1 is placed in position and the prongs 2 are then pushed into the ground by foot pressure, if necessary, so as to bring the base 1 against the ground and support the upright 3 in vertical position. This provides a firm anchorage and the upright is firmly supported against accidental dislodgment or overturning. The hose clamp 9 is then adjusted to any desired angle of tilt and the head is swiveled so that the hose clamp points in the desired direction, whereupon the clamp screws 8 and 11 are operated to secure the device in the position so adjusted. The hose may now be set into the socket 17 and will be firmly supported in this position. The angle of tilt or the direction of the hose may be adjusted at any time by loosening one or both of the clamping screws 8 and 11 and swinging the head and the hose clamp 9 to the desired position.

It will be seen that this invention provides a hose stand or simple structure, capable of being firmly anchored in place on the ground and adapted to hold the hose at any angle or in any direction for sprinkling a lawn. The structure is strong and the hose is rigidly supported, while at the same time the structure is simple and inexpensive.

While this invention has been described as embodied in a unitary device, it will be understood that the various individual features or sub-combinations thereof may be used alone without reference to other features. It is understood that the employment of such individual features or sub-combinations is contemplated by this invention and within the scope of the appended claim. It is obvious that various changes may be made, within the scope of the appended claim, in the details of construction without departing from the spirit of this invention; it is to be understood, therefore, that this invention is not limited to the specific details shown and/or described.

Having thus described the invention what is claimed is:

A hose stand, comprising, a rigid base casting having radiating arms providing a flat base adapted to rest upon the ground, downwardly-extending spikes secured in the ends of said arms adapted to penetrate the ground, an upright rod secured in the center of said base casting and having an annular groove at the top thereof, a swivel head on said rod, a retaining screw in said head entering said groove to retain said head on said rod, a clamping screw in said head engaging said rod to clamp said head against rotation thereon, said head having a flat side face, a flat-T-head engaging said face, a spring washer engaging said T-head and having a tongue locked against said swivel head, a clamping screw threaded in said swivel head and bearing against said washer to cause the latter to force said T-head yieldingly against said face, and upstanding spring clamps on said T-head adapted to receive and hold a hose.

HAROLD BENNETT BRISTOL.